(12) United States Patent
Jin et al.

(10) Patent No.: US 7,308,391 B1
(45) Date of Patent: Dec. 11, 2007

(54) UNIVERSAL HYDRAULIC SOLVER WITH TECHNIQUES FOR IMPROVING THE REPRESENTATION OF FLOW DATA

(75) Inventors: Ming Jin, Olney, MD (US); Jack S. Cook, Jr., Bethlehem, CT (US); Samuel R. Coran, Waterbury, CT (US); John A. Roulier, Storrs, CT (US); Michael K. Glazner, Bedford, NH (US)

(73) Assignee: Bentley Systems, Incorporated, Exton, PA (US)

( * ) Notice: Subject to any disclaimer, the term of this patent is extended or adjusted under 35 U.S.C. 154(b) by 682 days.

(21) Appl. No.: 10/338,216

(22) Filed: Jan. 8, 2003

(51) Int. Cl.
*G06G 7/48* (2006.01)
(52) U.S. Cl. .................... 703/10; 702/12; 73/152.18
(58) Field of Classification Search .................. 703/9, 703/10, 2; 702/12; 73/152.8; 405/52
See application file for complete search history.

(56) References Cited

U.S. PATENT DOCUMENTS

| | | | |
|---|---|---|---|
| 5,468,088 A * | 11/1995 | Shoemaker et al. | 166/245 |
| 5,511,188 A | 4/1996 | Pascucci et al. | |
| 5,758,347 A | 5/1998 | Lo et al. | |
| 5,787,283 A | 7/1998 | Chin et al. | |
| 5,813,798 A * | 9/1998 | Whiffen | 405/52 |
| 6,119,125 A | 9/2000 | Gloudeman et al. | |
| 6,247,019 B1 | 6/2001 | Davies | |
| 6,842,725 B1 * | 1/2005 | Sarda | 703/10 |
| 6,853,964 B1 * | 2/2005 | Rockwood et al. | 703/2 |

OTHER PUBLICATIONS

Journal of Hydraulic Engineering, Jan. 2000, vol. 126, No. 1, American Society of Engineers, pp. 89-91.
Journal of Hydraulic Engineering, Aug. 1999, vol. 125, No. 8, American Society of Civil Engineers, Water Resources Engineering Division, pp. 827-834.
Jin, Ming et al., Dynamic Flood Routing with Explicit and Implicit Numerical Solution Schemes, Journal of Hydraulic Engineering, Mar. 1997, pp. 164-173.
Boulos, Paul F. et al,. Explicit Calculation of Pipe-Network Parameters, Journal of Hydraulic Engineering, vol. 116, No. 11, Nov. 1990, pp. 1329-1344.
"Culvert Design. Inlet and Outlet Control," http://www.lmnoeng.com/Pipes/hds.htm, sited visted Aug. 21, 2006.

* cited by examiner

*Primary Examiner*—Albert W. Paladini
(74) *Attorney, Agent, or Firm*—Cesari and McKenna LLP

(57) ABSTRACT

A method and system for providing hydraulic modelers with the ability to accurately produce a surface representation of flow data that incorporates transitional elements in the underlying gravity hydraulic network is provided. The method includes triangulating surface techniques and smooth surface techniques that employ functions that enforce rules that preserve monotonicity as well as to preserve Q=0 when TW=HW. The value of Q can be calculated as well as the partial derivatives in the TW and HW directions for a point of interest. A smooth surface interpolation of the data, which maintains the above-noted conditions, and allows the quick evaluation of flow for any point in the data set, is provided.

19 Claims, 23 Drawing Sheets

FROM 308
FIG. 3A

Find the indices x-index and y-index of the lower left corner of the data rectangle containing (x,y) — 310

Triangulate this data rectangle — 312

Find the triangle containing (x,y) — 314

Find the parameters for the plane ax+by+cz=0 — 316

FROM 606
FIG. 6A

```
/* Refines the input arrays to be consistent with monotonicity and */
/* with the conditions necessary fit a smooth surface satisfying*/
/* monotonicity and q=0 when tw=hw. */
*/ Uses merge_array, refine_array, and calculate_array. */
void mon_refine_arrays(m,n,tw,hw,q,m1,n1,tw1,hw1,k,twind,hwind,rcase,q1)
int m;
int n;
int k;
numarray twind;
numarray hwind;
carray rcase;

rarray tw;
rarray hw;
barray q;

int *m1;
int *n1;

rarray tw1;
rarray hw1;
barray q1;

{
int m2;
int n2;
int i;
int j;
rarray tw2;
rarray hw2;
    merge_array(tw,hw,m,n,k,twind,hwind,tw1,&(*m1));
    refine_array((*m1),tw1,&m2,tw2);
    refine_array(n,hw,&n2,hw2);
    for (i=0; i<=m2; i++)
    {
        tw1[i]=tw2[i];
    }
    for (j=0; j<=n2; j++)
    {
        hw1[j]=hw2[j];
    }

(*m1)=m2;
    (*n1)=n2;
    calculate_array(m,n,*m1,*n1,tw,hw,tw1,hw1,k,twind,hwind,rcase,q,q1);
}
```
— 608

FROM 608
FIG. 6B

```
/* This function expands array xin by inserting the values of*/
/* yin which are in the range xin[0]...xin[nxin]. The new array*/
/* is placed in xout with indices 0...nxout. */
void merge_array(xin,yin,nxin,nyin,k,xind,yind,xout,nxout)
rarray xin;
rarray yin;

int nxin;
   int nyin;
   int k;
   numarray xind;
   numarray yind;
   rarray xout;
   int *nxout;
{
int j;
int i;
int xcount;
   for (i = 0; i<=nxin; i++)
   {
      xout[i]=xin[i];
   } xcount = 0;
   {
   for (j = yind[0]; j<=yind[k] ; ++j)
      {
      xout [xcount] = yin[j];
      xcount = xcount + 1;
      }
   j--;
   }
   /* for j */
   (*nxout) = xcount -1;
}
```
— 610

FROM 610
FIG. 6C

```
/* Produces array arout by inserting midpoints between the
consecutive entries of array arin */
void refine_array(m,arin,n,arout)
int m;
rarray arin;
int *n;
rarray arout;
{
int i;
int j;

(*n) = 2 * m;
   { for(i = 0; i <m; i++)
   {
   j = 2 * i;
   arout[j] = arin[i];
   arout[j + 1] =( arin[i] + arin[i + 1]) / 2;
   }
}
/* for i */
   arout[(*n)] = arin[m];
}
```
— 612

FROM 612
FIG. 6D

```
/* Calculates the values q1[i][j] for i=0 to m1 and j=0 to n1 */
/* by evaluating the triangulated surface determined by tw,hw,and q */
/* at the values tw1[i] hw1[j]. */
void calculate_array(m,n,m1,n1,tw,hw,tw1,hw1,k,twind,hwind,rcase,q,q1)
int m;
int n;
int k;
numarray twind;
numarray hwind;
carray rcase;
int m1;
int n1;
rarray tw;
rarray hw;
rarray tw1;
rarray hw1;
barray q;
barray q1;
{
int i;
int j;
double x;
double y;
double z;
double dzx;
double dzy;

{
    for (i = 0; i <=m1; i++)
    {
     x = tw1[i];
    {
       for (j = 0; j <=n1; j++)

{
    y = hw1 [j];
    evaluate(x,y,k,twind,hwind,rcase,m,n,tw,hw,q,&z,&dzx,&dzy);
    q1[i][j] = z;
    }
   }
  }
 }
}
```
— 614

FROM 614
FIG. 6E
Calculate the function and derivative values used to maintain the condition Q = 0 when HW = TW and to maintain monotonicity of the data ⎯ 616
Adjust auxiliary Q values to maintain that the data is monotone and satisfies Q=0 ⎯ 618
TO 620
FIG. 6G
FIG. 6F

UNIVERSAL HYDRAULIC SOLVER WITH TECHNIQUES FOR IMPROVING THE REPRESENTATION OF FLOW DATA

This application is related to commonly-owned U.S. patent application Ser. No. 10/338,230, entitled UNIVERSAL HYDRAULICS SOLVER WITH CURVE OVERLAP DETECTION AND REMOVAL TECHNIQUES, by Ming Jin et al., filed on even date herewith, which is incorporated by reference herein.

BACKGROUND OF THE INVENTION

1. Field of the Invention

This invention relates generally to computer-based modeling of gravity hydraulic network systems and, more particularly, to techniques for a representation of flow data within such systems.

2. Background Information

Computer-based modeling solutions for simulating the complete hydrodynamic response of pipe hydraulic network systems, such as those encountered in storm water and sanitary sewer collection systems are useful in the design, rehabilitation and simulation of such systems. The software, which performs the functions that describe the water distribution network, is often referred to as an hydraulic network solver or hydrodynamic solver (often commonly referred to generally as a "solver"). The solver is a computer program that simulates and predicts water pipe flows, hydraulic pressure conditions, run-off water, storm conditions and flooding conditions. In a network of pipes, the conditions can be described for the links (the pipes) and the nodes (the junctions) in such a system. There are a number of available software products that embody hydraulic network solvers and that provide general-purpose modeling.

The solvers, inter alia, compute and provide hydraulic solutions for complex differential equations. More specifically, computer-based modeling solutions for simulating the complete hydrodynamic response of hydraulic network systems, such as those encountered in storm water and sanitary sewer collection systems, are typically implemented employing numerical techniques for solving St. Venant equations. Frequently, solutions are obtained by iteratively solving a simultaneous system of equations governing the implicit solution of a finite-difference scheme that describes variation of flow over a mathematical grid of time and one dimension space. These equations that govern the system-wide hydraulic response are non-linear and are most often solved using Newton-Raphson numerical matrix-based solvers. The matrix is typically comprised of a set of equations that each describe a point on the mathematical grid. The results produced may include a family of hydraulic delivery curves that describe various aspects of a storm water and sanitary system.

In practice, it is quite difficult to implement a general modeling solution that exhibits accuracy and robustness over the entire range of flow conditions (and over the transitions that occur between these flow conditions) that are of interest to the engineering modeler. For example, in man-made hydraulic networks, flows diverge at junctions or man-made diversions and then outfall from the system entirely or split off and then return to converge again with the system at some down stream location. These transitions are difficult to model and it is difficult to thus provide hydraulic response curves for such aspects of the system. Other examples of transitions include those occurring when flows transition between dry-bed to free surface, or from gravity flow to pressurized flow, or from steeply sloped channels to mildly sloped, or flat, or adversely sloped, channels. In addition, a transition can occur from pipe to manhole to ditch to culvert. Each of these flow conditions, flow transitions and hydraulic situations needs to be described by a different set of governing equations. Successfully employing conventional numerical techniques with the variety of mathematical formulations that describe the various hydraulic structures is a challenging task.

More specifically, conventional techniques have run in to difficulty when attempting to describe the numerous hydraulic structures providing these transitions. Up to now, because the mathematical description of these systems is so complex, the trend has been to limit the range and type of network flow components used in the model to those elements whose hydraulic response can be described by simple equations, such as those occurring in pipe, manholes, weirs, orifices and prismatic channels. Thus, the conventional network solvers typically do not incorporate into the model such components as culverts, siphons, and detention pond control structures because they cannot be described mathematically by a single unified equation. However, to simply ignore those components does not give rise to an accurate model or a useful family of curves. Thus, approximations are often used to attempt to account for these structures that do not lend themselves to conventional numerical techniques, but these approximations are not always accurate.

Moreover, many models simulate network behavior at a particular time period, but the characteristics of the actual system continuously change with time. In addition, the equations used typically run in to difficulty during transition times. Transitions can result in separate, more complex transitional equations that are not readily solved by the solver engine. And if solved, these equations can provide unreliable data at transition points. This typically occurs in gravity networks. At transitional points, the equation results can also become unstable and are not robust.

The complexities are also increased when a number of different structures are involved in the solution. More particularly, when a structure or component is involved in a network analysis, that structure is typically described by a mathematical protocol that consists of selecting a particular set of working equations that are invoked depending upon the changing conditions that occur over the range of operation for that structure. For example, a typical pond riser flow response subject to rising flow will be governed first by weir limited flow, then entrance limited culvert flow and then partially submerged culvert flow and then, ultimately, submerged flow. Thus, four different sets of working equations must be employed to develop that flow response in that instance.

The hydraulic structures mentioned are typically dominated by local head losses and are transitional in nature. In storm-water management systems, these structures are frequently used to limit or control flow so that down stream areas are not severely impacted by unmanaged discharges from disturbed or developed areas, which could result in flooding conditions. For this reason, it is important to accurately model the hydraulics of these structures to determine their effectiveness, and thus their safety and effectiveness for protecting the community and the environment. However, the complex mathematical representation of such structures generally precludes their integration into conventional hydrodynamic network solvers, and instead engineers must utilize alternative modeling approaches to design or analyze systems that contain these structures, thus resulting in increased time and cost of the analysis.

Such alternative modeling approaches include employing conservative approximations and simplifying assumptions in order to model systems that include such structures. This results in a risk of oversimplification and inaccurate solutions describing the model. Alternatively, an intensely iterative explicit solution technique could be employed, but these can be slow to converge, resulting in lengthy run times that can hinder the efficiency of the design process and result in increased costs.

Due to these difficulties, the mathematical descriptions of these systems can involve three-dimensional surfaces that are not smooth, and in other words cannot be differentiated. The data that is produced for flow (O) as a function of tailwater (TW) and headwater (HW) includes data that is comprised of three matrices of values: $TW_i$, $HW_j$, $Q_{ij}$ for $0 \leq i \leq m$ and $0 \leq j \leq n$ where $Q_{ij}$ is the flow which corresponds to tailwater ($TW_i$) and headwater ($HW_j$). At transitional points, the three-dimensional surface representing the three matrices of data can be non-smooth and undifferentiable. Thus, there remains a need to produce a technique for providing a triangulated surface interpolation to the data points, which maintains the monotonicity of the data and allows for a quick evaluation of a flow value for any point within the system. There remains a further need for a smooth surface representation of flow data which provides a more detailed and accurate representation of the flow data.

There remains a further need for a straight-forward method and system for generating these surfaces that allows for the description of flow characteristics, transitional-flows or transitional points and other flow limiting and flow controlling structures in a hydraulic network.

It is thus an object of the present invention to provide a software program that generates highly accurate and robust solutions to model any passive hydraulic structure within a hydraulic network by providing the triangulated surface and smooth surface interpolation techniques.

It is a further object of the invention to provide a system and method for generating solutions that allow hydraulic modelers to accurately incorporate transitional hydraulic elements into a conventional, hydrodynamic network solver without lengthy computations or a variety of different sets of equations.

SUMMARY OF THE INVENTION

The disadvantages of prior techniques are overcome by the present invention which is a software program embodying a method and system for providing hydraulic surface representations of flow data for complex hydraulic network systems that include transitional flows and structures that are not otherwise readily described by conventional modeling techniques, but which can be readily and accurately described using the techniques of the present invention.

More specifically, in accordance with one aspect of the invention, a triangulated surface interpolation of the data, which maintains the monotonicity of the surface and allows a quick evaluation of flow value at any point in the system is provided. In addition, a mathematical response patch surface using special smoothing and regression techniques is provided that enforces monotonic characteristics. As used herein, "monotonic" shall mean that the first derivatives are either increasing or decreasing over the full solution domain.

In accordance with one aspect of the invention in which a triangulated surface is produced, the first step is to detect the indices where $TW_i = HW_j$. This produces two arrays and integers: $TW_{tmind[i]}$ and $HW_{hwind[i]}$ and integer k for which $TW_{twind[i]} = HW_{hwind[i]}$ for $i=0, \ldots, k$. The next step assigns a value or "rcase" to each data rectangle in the TW-HW plane in order to decide how to triangulate each rectangle. Each rectangle is essentially subdivided into two, three, or four triangles and the rectangles for which $TW_i \leq HW_j < TW_{i+1}$ are assigned a value of 1, 2, 3 or 4, while all other rectangles are assigned a value of 1. The values are used to assign the triangles in three-dimensional space which form the triangulated surface. Then, the flow Q can also be evaluated. The value of Q is determined by calculating the point on the plane determined by the corresponding triangle and three-dimensional space. In addition, the partial derivatives in the TW and HW directions for this point can also be calculated using this plane.

The method of the present invention also provides a smoothing technique in which a smooth surface representation of flow data is generated which preserves the monotonicity of the surface and the condition Q=0 when TW=HW.

The method involves the steps of interpolating monotone surface data using a technique of splitting each data rectangle into several triangles and introducing a mathematical surface patch over each triangle. The method includes determining the appropriate derivative values so that the control points calculated for each surface patch satisfies the conditions required to preserve monotonicity. The derivative values along with the data values are used to calculate the control points for each of the four surface patches. To improve results, the original data is augmented, in accordance with the invention, by inserting additional data points. More specifically, each original data rectangle is divided into four subrectangles. Thus, each original data rectangle is subdivided into 16 triangles. This provides enough free parameters to satisfy the interpolation algorithm itself as well as the condition Q=0 when HW=TW. The inventive procedure iteratively calculates the conditions for the requirement Q=0 when HW=TW and the requirement of the surface be smooth and monotone. It will thus converge when the data satisfies the conditions set forth at the outset. Thus, a software program embodying the procedure is provided which produces a smooth surface interpolation to the flow data to ij which maintains the condition that $Q_{ij}$ is monotone decreasing as a function of tailwater ($TW_i$) and monotone increasing as a function of headwater ($HW_j$) and satisfies the condition $Q_{ij}=0$ if $TW_i=HW_j$. The software program also allows the quick evaluation of a flow value Q (x,y) for any point (x,y) with $TW_0 \leq x \leq TW_m$ and $HW_0 \leq y \leq HW_n$ assuming the condition that for each i there is a j for which $TW_i=HW_j$.

BRIEF DESCRIPTION OF THE DRAWINGS

The invention will be better understood with reference to the accompanying figures of which:

FIGS. 3A through 3C together form a flow chart illustrating a procedure in accordance with the present invention for evaluating the flow and derivative values at TW=x and HW=y;

FIGS. 6A through 6G together form a flow chart illustrating one aspect of the smooth surface procedure of the present invention by which additional control points are set up for subdividing data rectangles to generate additional data points;

DETAILED DESCRIPTION OF AN ILLUSTRATIVE EMBODIMENT

The surface to be modeled in accordance with the present invention represents the flow in a gravity hydraulic network such as a storm water and sewage drainage system. Computer programs can produce data for a flow (O) as a function of tailwater (TW) and headwater (HW). The data comprises three matrices of values: $TW_i$, $HW_j$ and $Q_{ij}$ (for $0 \leq C$ i$\leq$m and $0 \leq j \leq n$), where $Q_{ij}$ is the flow which corresponds to the tailwater $TW_i$ and headwater $HW_j$. As noted herein, the surface representation of the flow can include surface discontinuities, slow curvature discontinuities, peaks and pits explainable only by system parameters such as grid spacing or other artifacts that are not desirable in the surface and which may have been caused by transitional irregularities or other difficulties in mathematical representation of the real world objects being modeled. Thus, a triangulated surface interpolation of this data can only be used to produce a meaningful surface representation of the flow data once the data has been cleansed of such irregularities as described in commonly-owned U.S. patent application Ser. No. 10/338, 230, filed on even date herewith, entitled UNIVERSAL HYDRAULICS SOLVER WITH CURVE OVERLAP DETECTION AND REMOVAL TECHNIQUES.

Figure 1A:
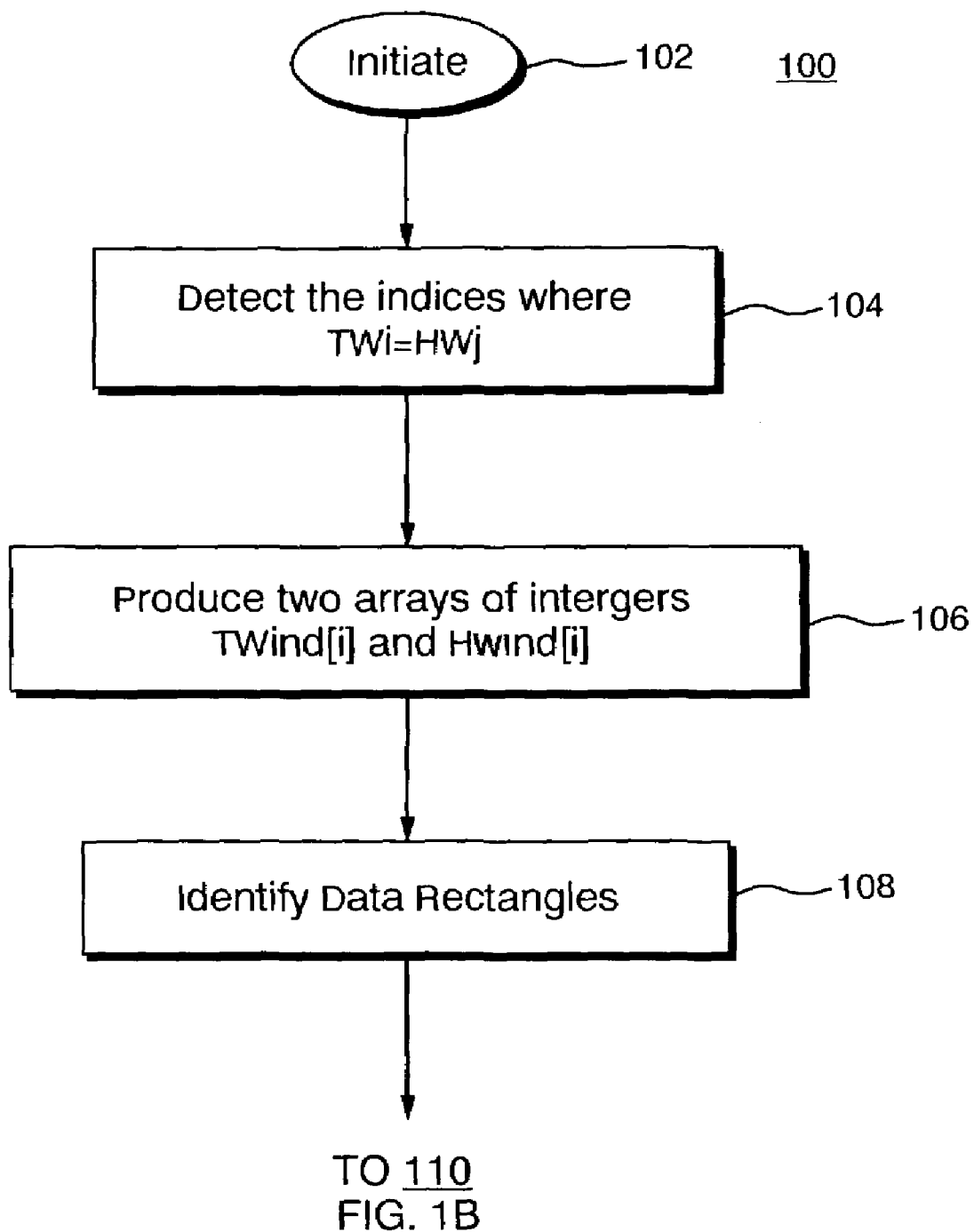
FIGS. 1A and 1B together form a flow chart illustrating an outline of the procedure of the present invention which produces a triangulated surface representation of flow data.
Figure 1B:
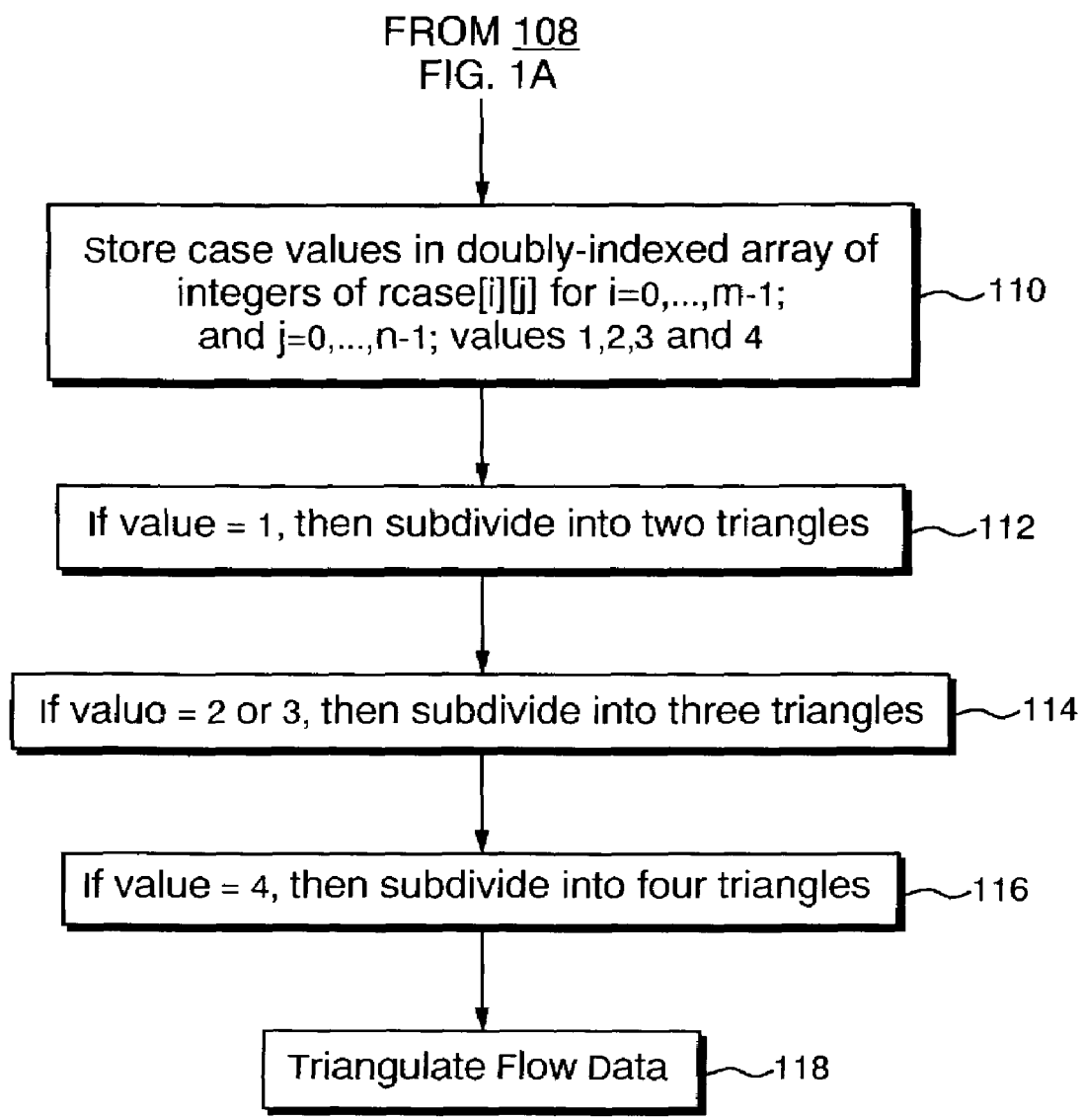

FIGS. 1A and 1B together form a flow chart, which illustrate the procedure 100 for producing a triangulated surface interpolation of this data, which maintains the conditions set forth herein.

The procedure is initiated at step 102 (FIG. 1A). In accordance with the method of the present invention, step 104 includes detecting the indices where $TW_i = HW_j$. In order to detect TW=HW, input parameters that may be set are:

TW—the real valued (float) array of tailwater values TW[i] for i=0, . . . ,m.
HW—the real valued (float) array of headwater values HW[j] for j=0, . . . ,n.
m and n—the index ranges of the TW and HW values.

The output parameters are:
k—the upper index of the arrays TWind and HWind (the lower index is 0).
TWind and HWind—the arrays of index values of the TW and HW arrays satisfying TW[TWind[i]]=HW[HWind[i]] for i=, . . . ,k.

As illustrated in step 106, in this phase, the software program produces two arrays of integers TWind[i] and HWind[i] and integer k for which TW[TWind[i]]=HW[HWind[i]] for i=0, . . . ,k.

Next, as illustrated in step 108, the data rectangles in the TW-HW plane are identified. The identified values are sometimes referred to herein as an "rcase" (or a "case number"). The purpose of this is to decide how to triangulate each rectangle. The case numbers are stored by the program, in a manner that will be well understood by those skilled in the art. In accordance with step 110 (FIG. 1B) of the method of the present invention, the case numbers can be stored in a doubly indexed array, as shown. In accordance with step 112, if the value is equal to 1, then the rectangle is subdivided into two triangles in accordance with this aspect of the invention. As shown in step 114, if the value is equal to 2 or 3, then the rectangle is subdivided into three triangles. In accordance with step 116, if the value is equal to 4, then the rectangle is subdivided into four triangles. The rectangles for which $TW_i \leq HW_j < TW_{i+1}$ are assigned a value of 1, 2, 3 or 4. Other rectangles are assigned a value of 1.

Then, in accordance with step 118 of FIG. 1B, the triangulation is performed. The triangulation of each data rectangle is, in accordance with the method of the present invention, described in further detail with reference to FIG. 2.

Figure 2:
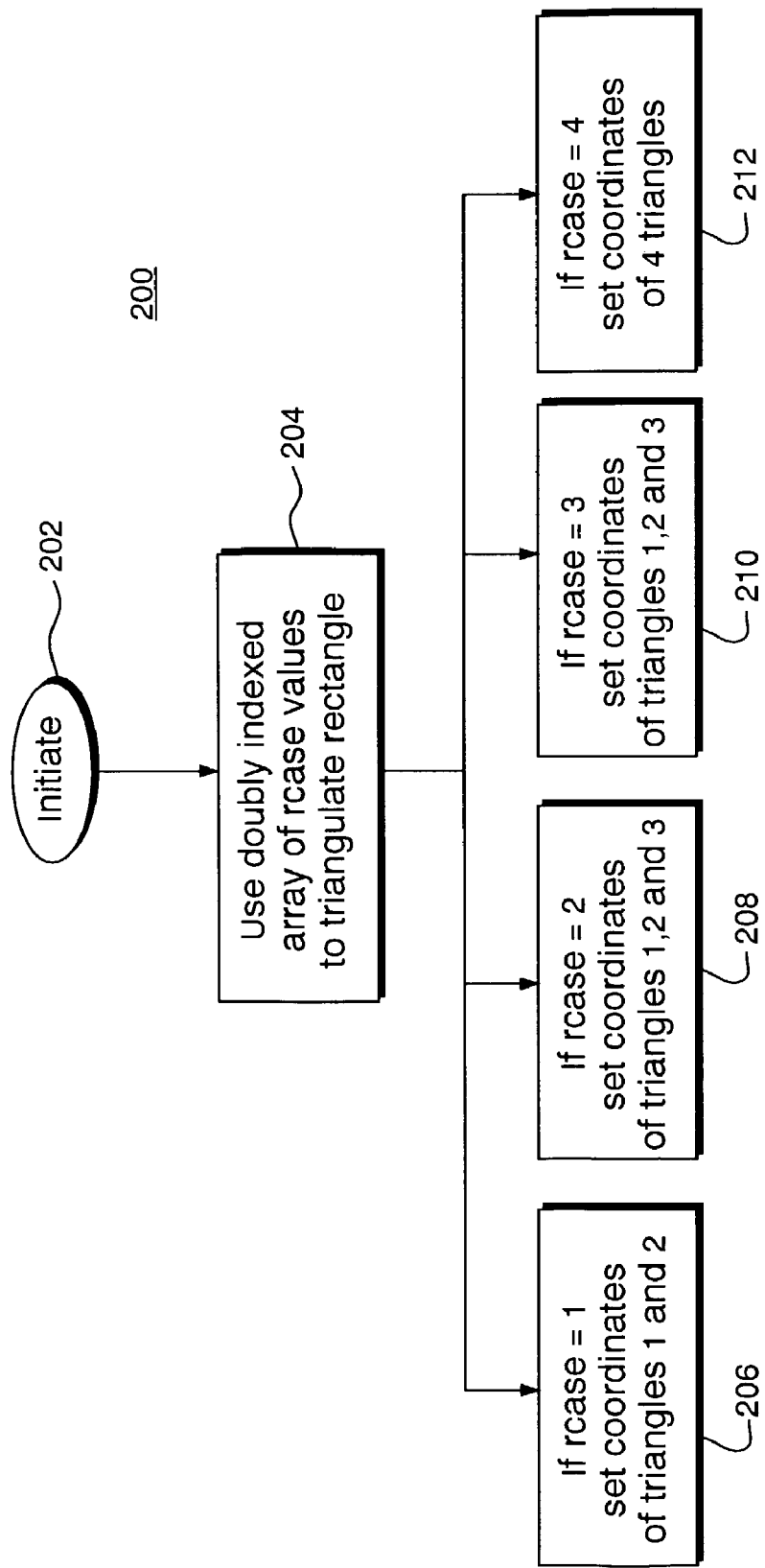
FIG. 2 is a flow chart illustrating one aspect of the triangulation procedure, in accordance with the present invention, for triangulating each data rectangle.

FIG. 2 is a flow chart illustrating a procedure 200 embodying the inventive software program that sets forth the method of triangulating a given data rectangle in the hydraulic network. The program is initiated, as illustrated in step 202. The input parameters are:

The input parameters are:
i,j—the indices of the data rectangle to be triangulated.
m and n—the index ranges of the TW and HW values.
TW—the real valued (float) array of tailwater values TW[i] for i=0, . . . ,m.
HW—the real valued (float) array of headwater values HW[j] for j=0, . . . ,n.
q—the doubly indexed array of flow values.
rcase—the doubly indexed array of case numbers (1, . . . ,4) to be used in setting up the triangulation.

The output parameters are:
numtri—the number (2, 3, or 4) of triangles to be used in the data rectangle with lower left index (i,j).
ptri—the array of triangles in the triangulation of the data rectangle with lower left index (i,j).

As shown in step 204, the program uses the doubly indexed array "rcase", which was described with reference to FIGS. 1A and 1B, to triangulate the rectangle. As illustrated in step 206, for rcase=1, there are two triangles and the method of the present invention includes the step of setting the coordinates of the vertices of triangle 1 and setting the coordinates of the vertices of triangle 2. As illustrated in step 208, for each rcase, the vertices of the triangles to be formed are set more specifically, for rcase=2, there are 3 triangles and the method includes the step of setting the coordinates of the vertices of triangle 1, then setting the coordinates of the vertices of triangle 2 and then setting the coordinates of the vertices of triangle 3. For the case of rcase=3, there are 3 triangles and the method of the present invention, includes setting the coordinates of the vertices of triangle 1, triangle 2 and triangle 3. As shown in step 212, if rcase=4, then the coordinates are set for triangles 1, 2, 3 and 4. And, in this manner, all of the triangles have been identified and the coordinates have been set for each and thus the data rectangles which make up the representation of the system, are each triangulated.

Figure 3A:
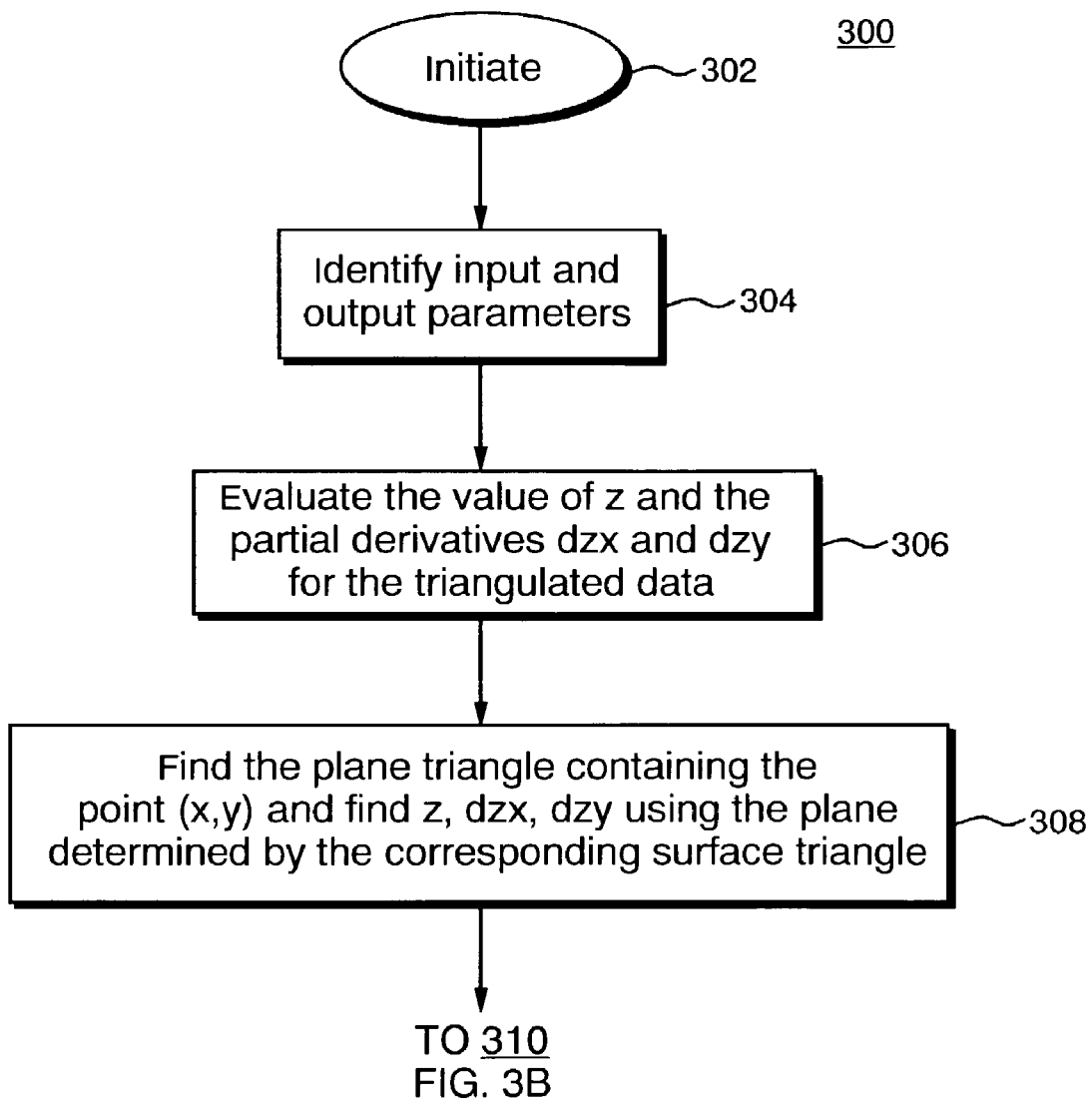
Figure 3C:
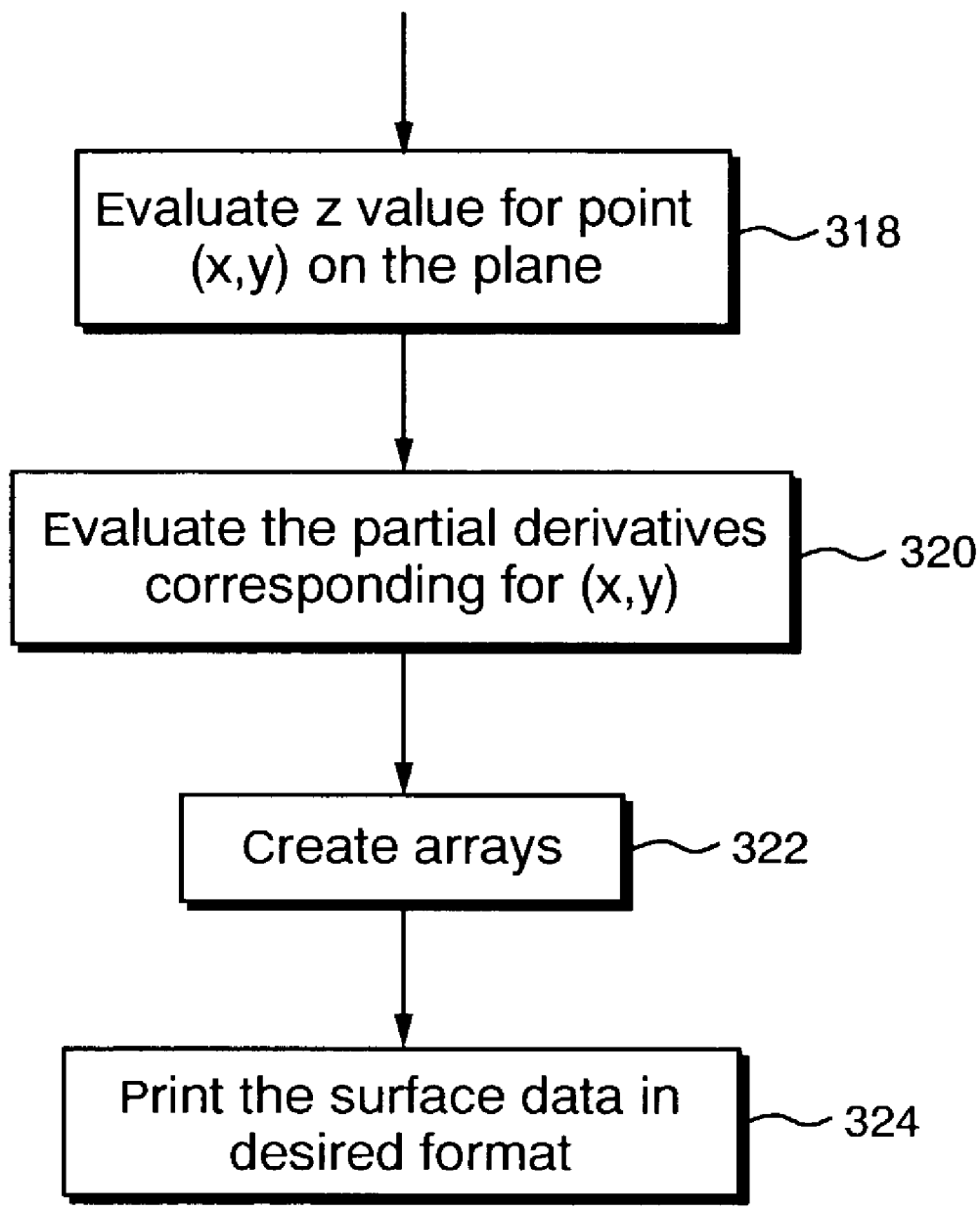

FIGS. 3A through 3C together form a flow chart illustrating the procedure 300 in accordance with the present invention, which is a method for evaluating the flow and derivative values at TW=x and HW=y. The program is initiated as illustrated in step 302.

The input parameters are:

x, y—the coordinates of the point to be evaluated.

k—the upper index of the arrays TWind and HWind (the lower index is 0) determined by function set_H-WeqTW_ind.

TWind and HWind—the arrays of index values of the TW and HW arrays satisfying TW[TWind[i]]=HW[HWind[i]] for i=0, . . . ,k determined by function set_H-WeqTW_ind.

rcase—the doubly indexed array of case numbers (1, . . . ,4) to be used in setting up the triangulation.

m and n—the index ranges of the TW and HW values.

TW—the real valued (float) array of tailwater values TW[i] for i=0, . . . ,m.

HW—the real valued (float) array of headwater values HW[j] for j=0, . . . ,n.

Q—the doubly indexed array of flow values.

The output parameters are:

z—the flow value on the triangulated surface corresponding to x and y.

dzx—the partial derivative in the x (TW) direction corresponding to x and y.

dzy—the partial derivative in the y (HW) direction corresponding to x and

The first step illustrated at step 304 is to identify the input and output parameters as just discussed. Then, in step 306, the procedure evaluates the value z and the partial derivatives dzx and dzy for the triangulated data. As noted, the data has been triangulated in accordance with the procedures illustrated with respect to FIG. 2. This produces the triangular plane containing the point x,y and finds z, dzx, dzy using the plane determined by the corresponding surface triangle, as illustrated in step 308 of FIG. 3. Step 310 (FIG. 3B) is to find the x-index and y-index of the lower left corner of the data rectangle containing x,y. This data rectangle is then triangulated as illustrated in step 312. More specifically, this procedure applies the triangulation algorithm described in FIG. 2 to the rectangle at hand. As shown in step 314, the procedure then finds the triangle containing (x,y). As shown in step 316, the parameters for the plane ax+by+cz+d=0 determined by the triangle are found. In accordance with step 318 (FIG. 3C), the method of the present invention includes the step of evaluating the z value corresponding to (x,y) on the plane. In other words, the elevation aspect is taken into account. Then, step 320 includes evaluating the partial derivatives corresponding to (x,y), thus evaluating the slope. Then, as shown in step 322, the arrays of this information are developed to produce the triangulated surface representations. Optionally, as shown in step 324, the arrays can be printed in the form of surface data to files as input formats or the surface data can be printed to a file to view as a family of curves. Alternatively, the triangles can be printed to files using detailed triangulations of each rectangle using the rcase information, which has been described above.

Figure 4A:
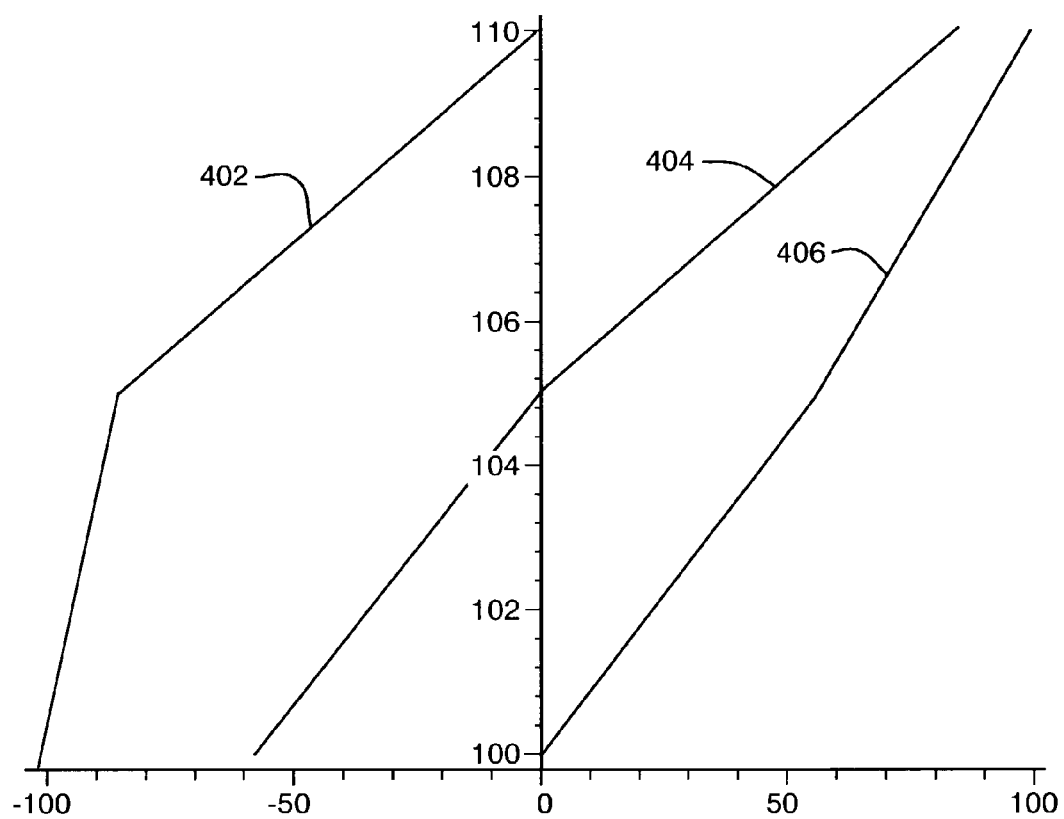
FIGS. 4A–4F are charts illustrating examples of the triangulation function of the present invention.
Figure 4B:
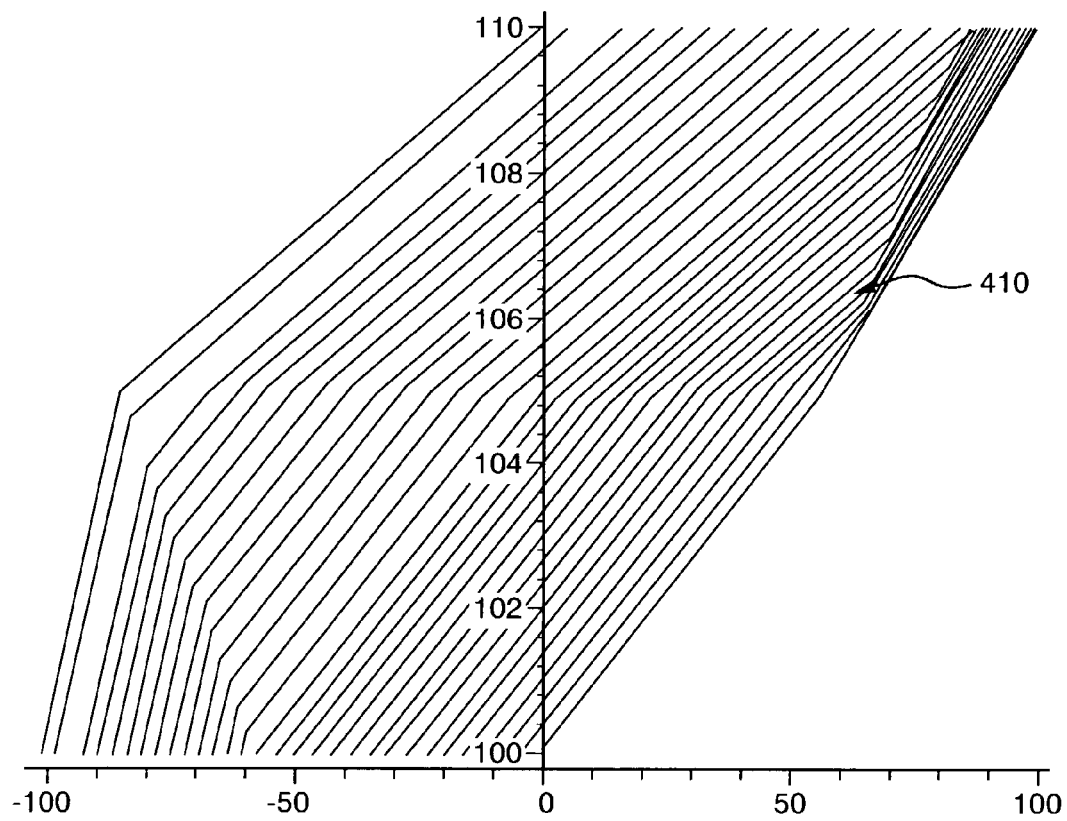

A few examples in the form of graphs of surface data and families of TW curves will now be considered. The examples illustrate the inventive procedure for preserving the monotonicity of the surface data as well as the condition Q=0 when TW=HW. In the plots shown, Q is plotted as a function of TW and HW. In the examples showing curve data, the horizontal axis is flow Q and the vertical access is headwater (HW). As illustrated in FIG. 4A, three curves: 402, 404 and 406 corresponding to a set of data with 3 TW values and 3 HW values with a 3×3 array of Q values are plotted as TW curves. Note that the curves are all monotone increasing as HW increases. Thus, monotonicity is preserved.

Figure 4C:
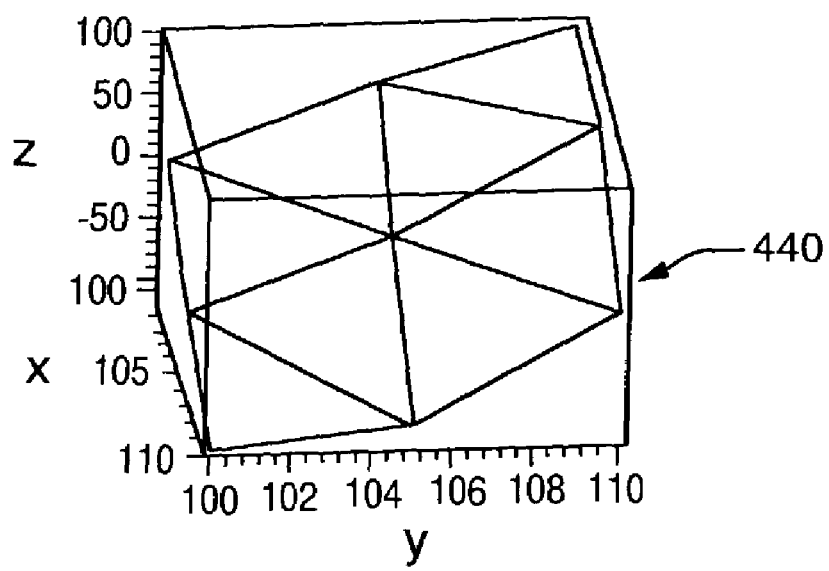
Figure 4D:
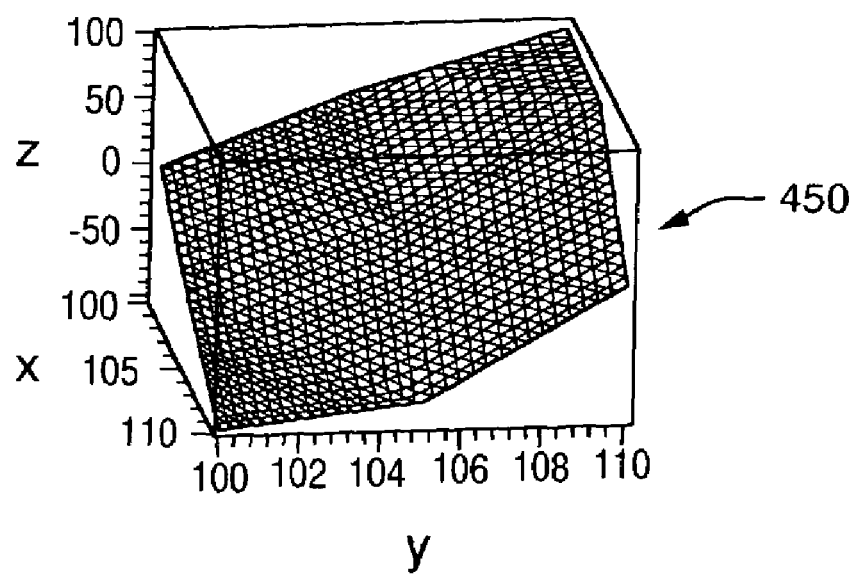

FIGS. 4C and 4D are the surface plots of Q(z) as a function of TW(x) and HW(y) for the triangulated original data 440 and the data fit at 31 TW and 31 HW values respectively. It can be seen that the second triangle data file 450 is a continuous representation, which preserves the monotonicity of the original data.

Figure 4E:
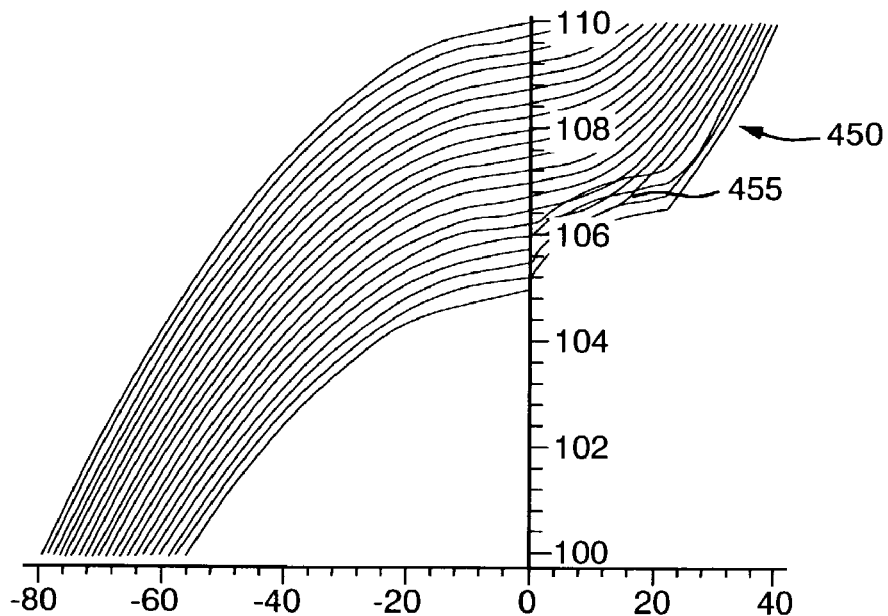
Figure 4F:
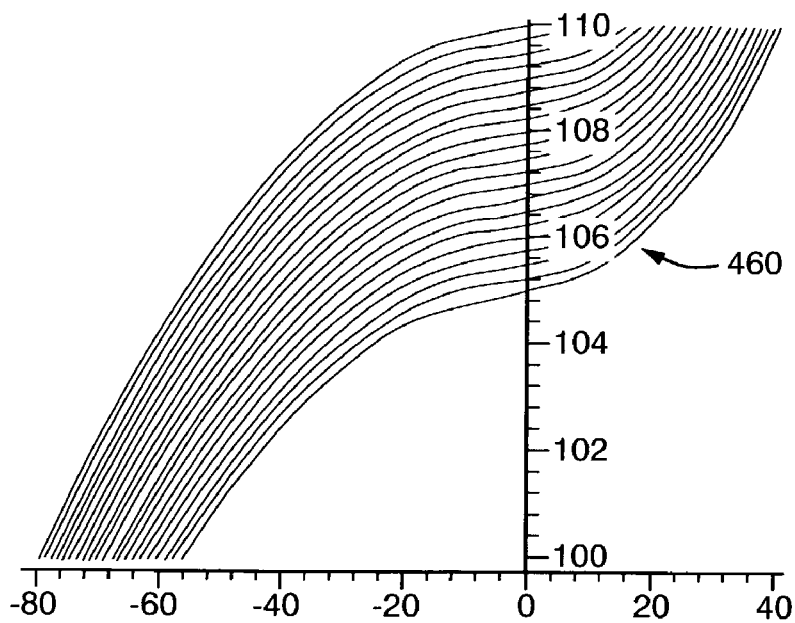

In addition, it is noted that prior to the triangulation technique for providing an improved surface representation of flow data, it may be necessary or desirable to remove curve overlap in a family of TW curves. Curve overlap is removed in accordance with the invention described in commonly-owned U.S. patent application Ser. No. 10/338,230 filed on even date herewith. In accordance with that description, which is hereby incorporated by reference in its entirety, a family of curves such as that illustrated in FIG. 4E show a set of curves 450 that include overlap in the area designated generally as 460. In the techniques described in the above-referenced co-pending patent application, the curve overlap is removed. The resulting family of curves is illustrated in FIG. 4F in which it can be seen that curve overlap has been removed. Thereafter, the data represented by those curves can be subjected to the triangulation techniques described herein, and/or the smoothing techniques described hereinafter.

In accordance with yet another aspect of the invention, a smooth surface is provided which preserves monotonicity and the condition Q=0 when TW=HW and provides this smooth surface for a situation where the flow data is to be determined with greater accuracy. In accordance with one aspect of the invention, a procedure is provided that generally is an algorithm to interpolate monotonic surface data by a smooth monotonic surface. An algorithm is known for a similar case (Han and Shumaker) by using Sibson split of each data rectangle into four triangles. As will be understood by those skilled in the art, a triangular degree 3 Bezier surface patch is produced over each triangle. However, the results do not preserve the property that Q=0 when HW=TW as required in the present application, and do not apply directly to data that is increasing in one variable and decreasing in the other. Thus, the present invention has provided an algorithm to interpolate the monotone surface data with a smooth monotone surface and which satisfies these criteria.

Figure 5:
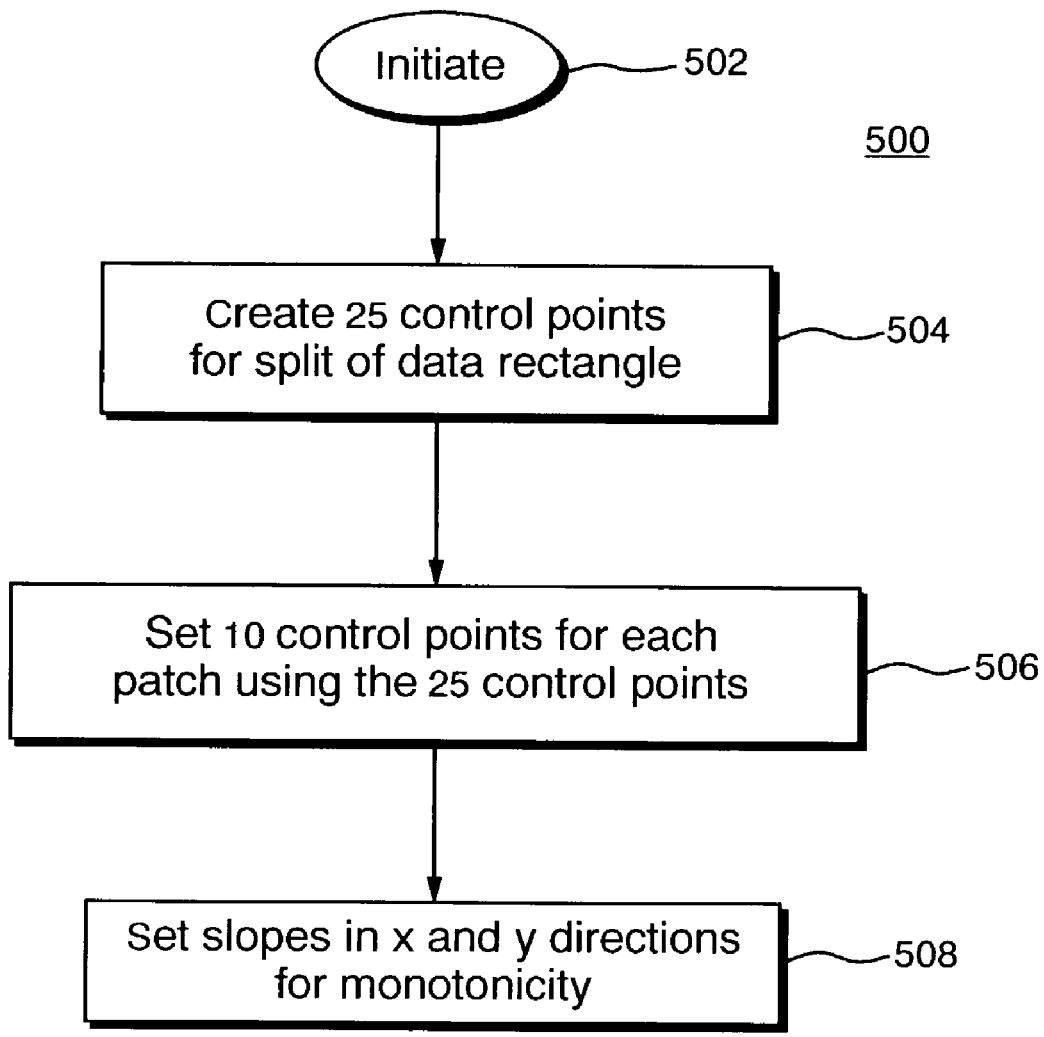
FIG. 5 is a flow chart illustrating an outline of the procedure for producing a smooth surface interpolation of flow data.

As illustrated in FIG. 5, the procedure 500 begins at step 502 when the software program embodying the invention is initiated. As illustrated in step 504, the program now sets up 25 control points for the Sibson split of a data rectangle. The variables can be numbered 0–24 rather than from 1-25. There are typically 25 control points for performing this aspect of the invention, however, other algorithms using different numbers of control points can be adapted to this application, while remaining within the scope of the present invention.

The input parameters are:

z—the 2×2 array of 3 dimensional coordinates for the four data rectangle vertices.

zx—the 2×2 array of partial derivatives in the x direction at the four vertices.

zy—the 2×2 array of partial derivatives in the y direction at the four vertices. The output parameter is:

cs1—the array of 25 control points for the four triangular Bezier patches.

The next step is to set 10 control points for each of the four-degree three Bezier patches using the 25 control points calculated in step 504, and this is illustrated in step 506. The input parameters for this function are:

z—the 2×2 array of 3 dimensional coordinates for the four data rectangle vertices.
 zx—the 2×2 array of partial derivatives in the x direction at the four vertices.
 zy—the 2×2 array of partial derivatives in the y direction at the four vertices.

The output parameter is:

ctal—the array of ten control points for each of the four triangular Bezier patches. Note that the variable definition allows for up to 36 control points per patch. This allows for higher degree patches, and may be used in particular applications of the invention when greater accuracy is desired. This option is incorporated within the scope of the present invention, to accommodate a 4×4 (16 point) array, for example, for cases in which other higher degree patches are required, or are desirable in the relevant application.

The procedure 500 is a modification of the Han-Schumaker algorithm to handle data, which is increasing in one variable and decreasing in the other variable. It sets the slopes in the x and y directions to guarantee monotonicity. This is illustrated in step 508. It is noted that in accordance with the procedure of the present invention, the method has been provided to address hydraulic data, which is decreasing in one variable and increasing in the other (TW and HW) and this was not a feature that was addressed by prior art techniques. It is preferred to provide a tolerance EPS=1.0E-10 for comparisons to allow for roundoff error, but, of course, as will be understood by those skilled in the art, other error tolerance can be set, depending upon the particular application in which the invention is used. For this step in the procedure, the input parameters are:

m and n—the upper index ranges of the x and y array values. The lower index is 0.
 x—the array of m+1 x values.
 y—the array of n+1 y values.
 z—the (m+1)×(n+1) array of z values.
 zx—the (m+1)×(n+1) array of partial derivatives in the x direction.
 zy—the (m+1)×(n+1) array of partial derivatives in the y direction.

The output parameter is:

zx—the modified (m+1)×(n+1) array of partial derivatives in the x direction.
 zy—the modified (m+1)×(n+1) array of partial derivatives in the y direction.
 flag—a flag to determine if any changes were made to the input derivative values. flag=0 for no change. flag=1 if a change occurred. This is used in the iterative process employed in adjust_slopes3, which calls this function.

As noted, step 508 adjusts the slopes of the data to give a monotonicity-preserving surface fit. The surface preserves monotonicity, however, the surface may not preserve the property that Q=0 when HW=TW, which is preferable in modeling the hydraulic systems as discussed.

Figure 6A:
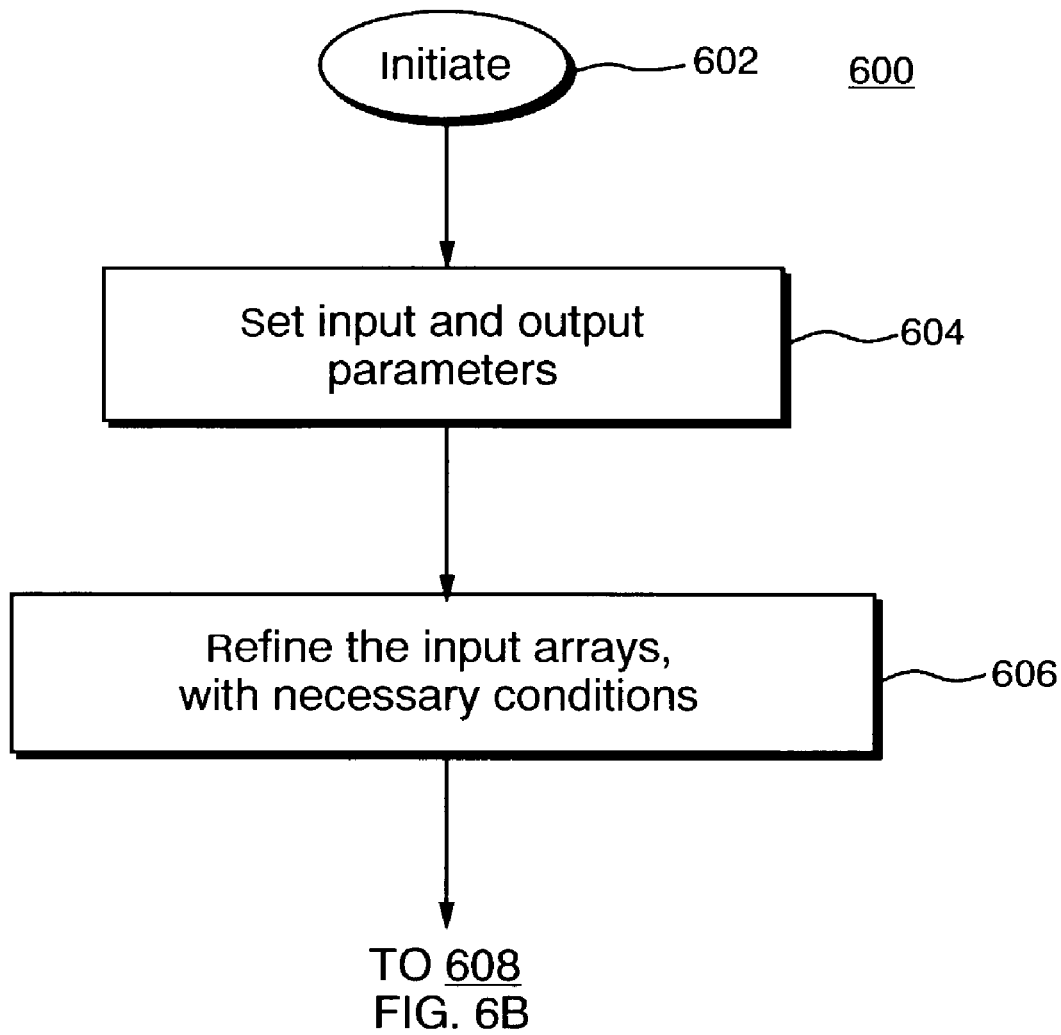

This is addressed in accordance with another aspect of the present invention, in which procedure 600 of FIGS. 6A and 6B is a method for solving with this additional constraint. After the procedure begins at step 602, initial input parameters are set at step 604, and the next step 606 begins a process of augmenting the original data by inserting additional data points. More specifically, new data is added to the TW, HW and Q arrays to allow enough free parameters to provide an accurate solution to the problem. More specifically (as illustrated in step 604), the input and output parameters are set as follows:

The input parameters are:

TW—the real valued array of tailwater values TW[i] for i=0, . . . ,m.
 HW—the real valued array of headwater values HW[j] for j=0, . . . ,n.
 Q—the doubly indexed array of flow values
 k—the upper index of the arrays TWind and HWind (the lower index is 0) determined by function set_HWeqTW_ind.
 TWind and HWind—the arrays of index values of the TW and HW arrays satisfying TW[TWind[i]]=HW[HWind[i]] for i=0, . . . ,k determined by function set_HWeqTW_ind.
 rcase—the doubly indexed array of case numbers (1, . . . ,4) to be used in setting up the triangulation.

The output parameters are:

m1 and n1—the index ranges of the refined TW1 and HW1 values.
 TW1—the refined real valued array of tailwater values TW[i] for i=0, . . . ,m1.
 HW1—the refined real valued array of headwater values HW[j] for j=0, . . . ,n1.
 Q1—the refined doubly indexed array of flow values.

As shown in step 606, this aspect of the procedure refines the input arrays to be consistent with monotonicity and with the conditions necessary to fit a smooth surface satisfying monotonicity and Q=0 when TW=0. This involves merging the arrays, refining the arrays and calculating the arrays. More specifically, as illustrated in step 608, the software performs a procedure for refining the arrays. The procedure then includes expanding an array x in by inserting the values of y in that are in the range $X_{in[0]} \ldots X_{in[nxin]}$. The new array is placed in $x_{out}$ with indices $0 \ldots nx_{out}$, as shown in step 610. Step 612 illustrates the aspect of the method of the present invention in which a new array is produced by inserting midpoints between the consecutive entries of the array "arin". The resulting array is then calculated as illustrated in further detail in step 614. Though not limiting to the invention, examples of a suitable software procedure for steps 610, 612 and 614 are provided in the illustrations for purposes of adequate description to aide those skilled in the art in understanding the invention. However, it should be understood that other equivalent steps can be employed to accomplish the same functionality, while remaining within the scope of the present invention. In accordance with the invention, the procedure (step 616) now calculates the function and derivative values used to maintain the condition Q=0 when HW=TW and monotonicity of the data. The input parameters for calculating the adjusted function values are:

m and n—the index ranges of the TW and HW values.
 TW—the real valued array of tailwater values TW[i] for i=0, . . . ,m.
 HW—the real valued array of headwater values HW[j] for j=0, . . . ,n.
 q—the doubly indexed array of flow values.
 k—the upper index of the arrays TWind and HWind (the lower index is 0) determined by function set_HWeqTW_ind.
 TWind and HWind—the arrays of index values of the TW and HW arrays satisfying TW[TWind[i]]=HW[HWind[i]] for i=0, . . . ,k determined by function set_HWeqTW_ind.

rcase—the doubly indexed array of case numbers (1, . . . ,4) to be used in setting up the triangulation.

The output parameters are:
Q—the doubly indexed array of flow values with the original data values unchanged. Only the auxiliary Q values added in mon_refine_arrays are modified.

Figure 6G:
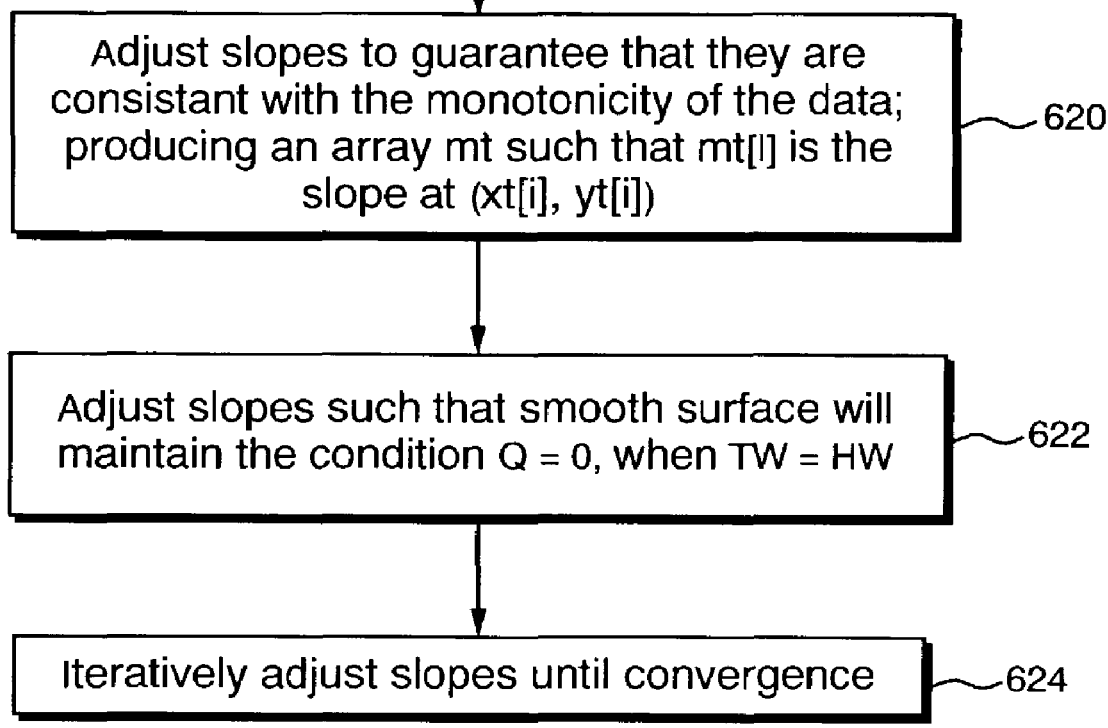

After setting the input parameters for this aspect of the invention, the procedure moves to step 618, which is to set the auxiliary Q values to guarantee that the data is monotone and satisfies Q=0 when TW=HW. This does not alter the original Q values from the input data file. The next step, step 620 (FIG. 6G) is to set the slopes in the x and y directions to slopes consistent with the monotonicity of the data. This can be performed producing an ordered array such that $xt[0] \leq xy[1] \leq \ldots \leq xt[n]$ and corresponding array yt, producing an array mt so that mt[i] is the slope at (xt[i], yt[i]), as illustrated in step 620. The input parameters for this aspect of the procedure are:
m and n—the index ranges of the TW and HW values.
TW—the real valued array of tailwater values TW[i] for I=0, . . . ,m.
HW—the real valued array of headwater values HW[j] for j=0, . . . ,n.
Q—the doubly indexed array of flow values.

The output parameters are:
mx—the array mx[i] for i=0, . . . ,m of slopes in the TW direction.
my—the array my[j] for j=0, . . . ,n of slopes in the HW direction.

The slopes are further adjusted in accordance with step 622, so that the smooth surface will maintain the condition Q=0 when HW=TW. This step also keeps the slopes consistent with the monotonicity of the data. The data rectangles have equal length edges due to the refined arrays that occurred at steps 606 through 614. The slope conditions set up in this step 622 mean that the diagonal values of the array are all 0 on the data squares with HW=TW. This substantially guarantees that the condition Q=0 when TW=HW is preserved. The input parameters for performing this function (step 622) are:
m and n—the index ranges of the TW and HW values.
k—the upper index of the arrays TWind and HWind (the lower index is 0) determined by function set_H-WeqTW_ind.
TWind and HWind—the arrays of index values of the TW and HW arrays satisfying TW[TWind[i]]=HW[HWind [i]] for i=0, . . . ,k determined by function set_H-WeqTW_ind.
rcase—the doubly indexed array of case numbers (1, . . . ,4) to be used in setting up the triangulation.
TW—the real valued array of tailwater values TW[i] for i=0, . . . ,m.
HW—the real valued array of headwater values HW[j] for j=0, . . . ,n.
Q—the doubly indexed array of flow values.
mx—the array mx[i] for i=0, . . . ,m of slopes in the TW direction.
my—the array m[j] for j=0, . . . ,n of slopes in the HW direction.

The output parameters are:
mx—the adjusted array mx[i] for i=0, . . . ,m of slopes in the TW direction.
my—the adjusted array my[j] for j=0, . . . ,n of slopes in the HW direction.

And finally, in step 624, the procedure iteratively adjusts the slopes until no further changes are needed, and the solution will thus converge. By way of example, it has been found that the solutions typically converge in one or two iterations. The input parameters for the convergence procedure of step 624 may be:
m and n—the index ranges of the TW and HW values.
k—the upper index of the arrays TWind and HWind (the lower index is 0) determined by function set_H-WeqTW_ind.
TWind and HWind—the arrays of index values of the TW and HW arrays satisfying TW[TWind[i]]=HW[HWind [i]] for i=0, . . . ,k determined by function set_H-WeqTW_ind.
rcase—the doubly indexed array of case numbers (1, . . . ,4) to be used in setting up the triangulation.
TW—the real valued array of tailwater values TW[i] for i=0, . . . ,m.
HW—the real valued array of headwater values HW[j] for j=0, . . . ,n.
Q—the doubly indexed array of flow values.
mx—the array mx[i] for i=0, . . . ,m of slopes in the TW direction.
my—the array my[j] for j=0, . . . ,n of slopes in the HW direction.

The output parameters are:
mx—the adjusted array mx[i] for i=0, . . . ,m of slopes in the TW direction.
my—the adjusted array my[j] for j=0, . . . ,n of slopes in the HW direction.

Figure 7A:
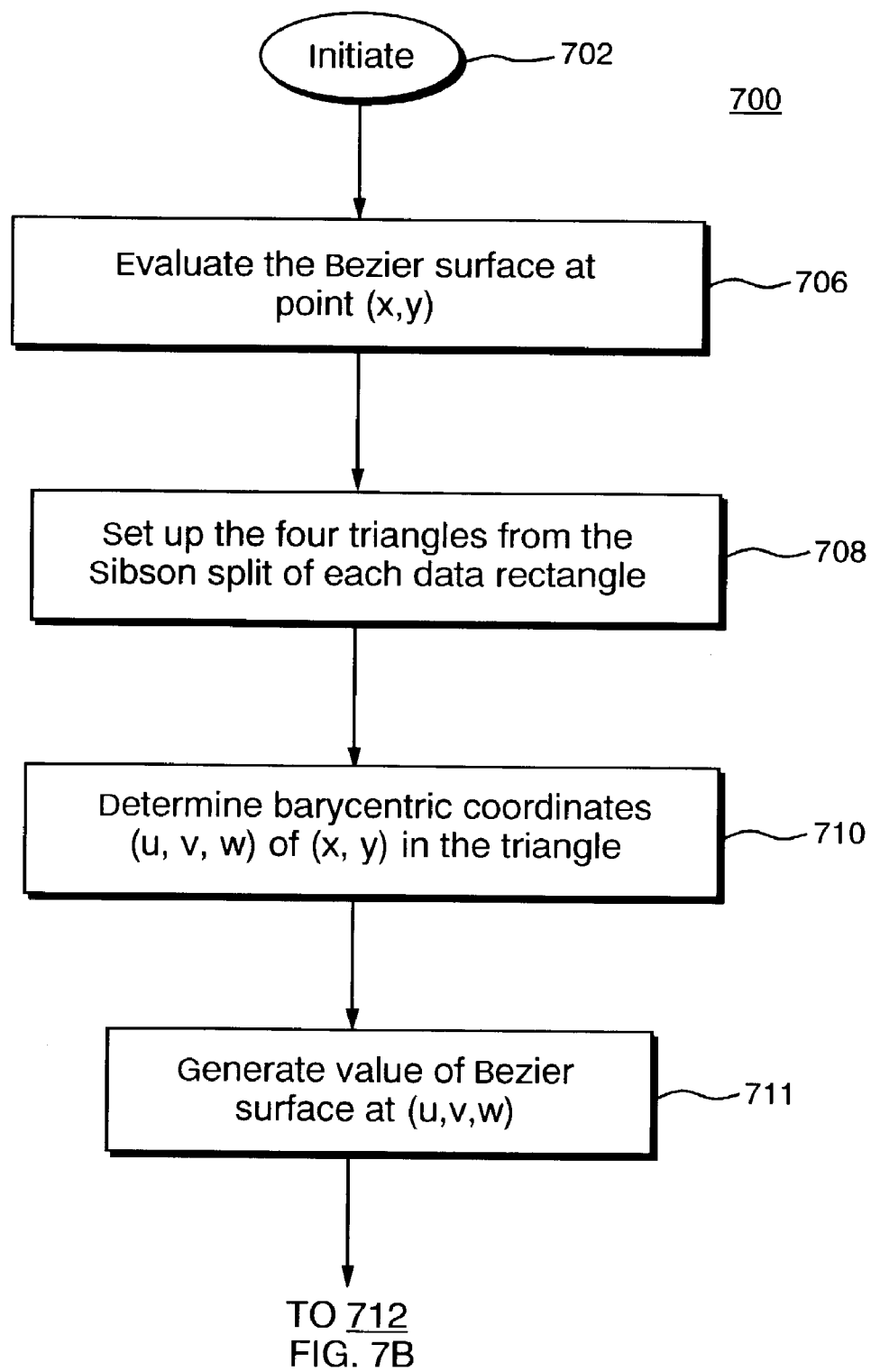
FIGS. 7A and 7B together form a flow chart of a procedure in accordance with the present invention for maintaining monotonicity and for maintaining Q=0 when HW=TW for the smooth surface.
Figure 7B:
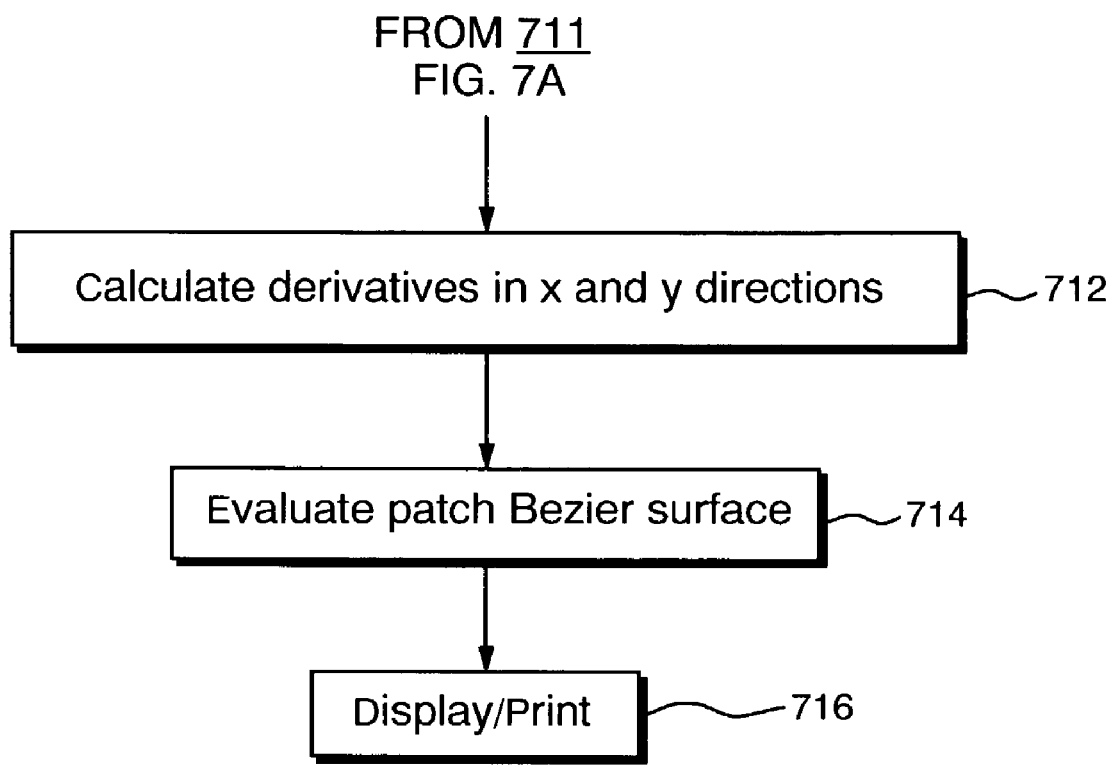

FIGS. 7A and 7B together illustrate a procedure 700 for evaluating the points on the surface patch. After the software program embodying the invention is initiated as shown in step 702, the input parameters are set as:
u, v, w—the barycentric coordinates of the point to be evaluated.
n—the degree of the Bezier surface—normally n=3.
ctl—the doubly indexed array of control points for the surface.
bcl—the doubly indexed array of binomial coefficients C(n,k).

The next step, 704, includes the program generating the value of a Bezier surface at a particular point (u,v,w). As shown in step 706, the next step is to evaluate the Bezier surface at the point on the plane with coordinates (x,y). And, the input parameters for this evaluation are:
x, y—the coordinates of the point to be evaluated.
m and n—the index ranges of the TW and HW values.
TW—the real valued array of tailwater values TW[i] for I=0, . . . ,m.
HW—the real valued array of headwater values HW[j] for j=0, . . . ,n.
dt—the real valued array of derivatives dt[i]for i=0, . . . ,m in the TW direction.
dh—the real valued array of derivatives dh[j] for j=0, . . . ,n in the HW direction.
Q—the doubly indexed array of flow values.

The output parameter is:
z—the flow value on the triangulated surface corresponding to x and y.

This process evaluates the smooth triangular Bezier patch surface at a particular point (x,y).

In accordance with step 708, the four triangles from the Sibson split of the data rectangles, which were discussed herein, are now set up by the program. This is called by the portion of the procedure that evaluates the Bezier surface to help locate the triangle containing the point xy. The next step, 710, finds the barycentric coordinates u, v, w of x,y in the triangle that was located in step 708. Next, numerical methods are used to calculate the derivatives in the x and y directions, as illustrated in step 712. For this, the input parameters are:

x, y—the coordinates of the point to be evaluated.

m and n—the index ranges of the TW and HW values.

TW—the real valued array of tailwater values TW[i] for i=0, . . . ,m.

HW—the real valued array of headwater values HW[j] for j=0, . . . ,n.

dt—the real valued array of derivatives dt[i] for i=0, . . . ,m in the TW direction.

dh—the real valued array of derivatives dh[j] for j=0, . . . ,n in the HW direction.

Q—the doubly indexed array of flow values.

The output parameters are:

dx and dy—the derivatives in the x and y directions at point (x,y).

Figure 8A:
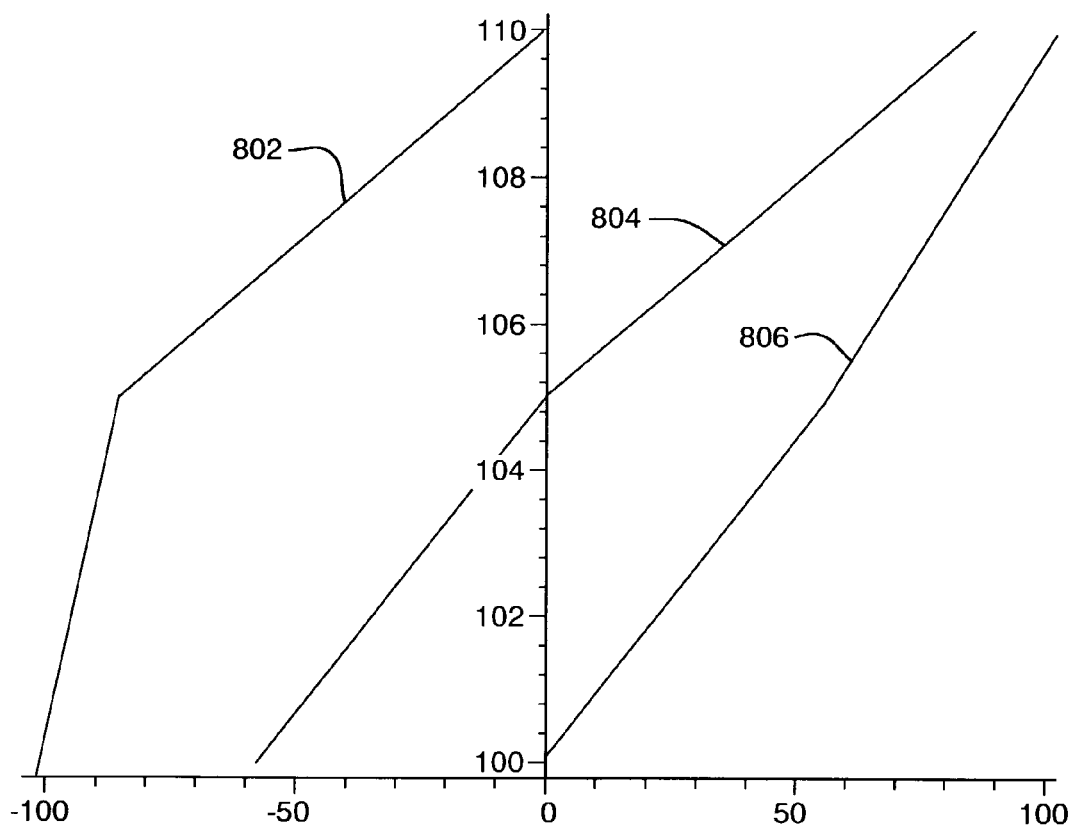
FIGS. 8A–8D illustrate a set of curves corresponding to a set of data which have been triangulated and smoothed in accordance with the procedures of the present invention.
Figure 8B:
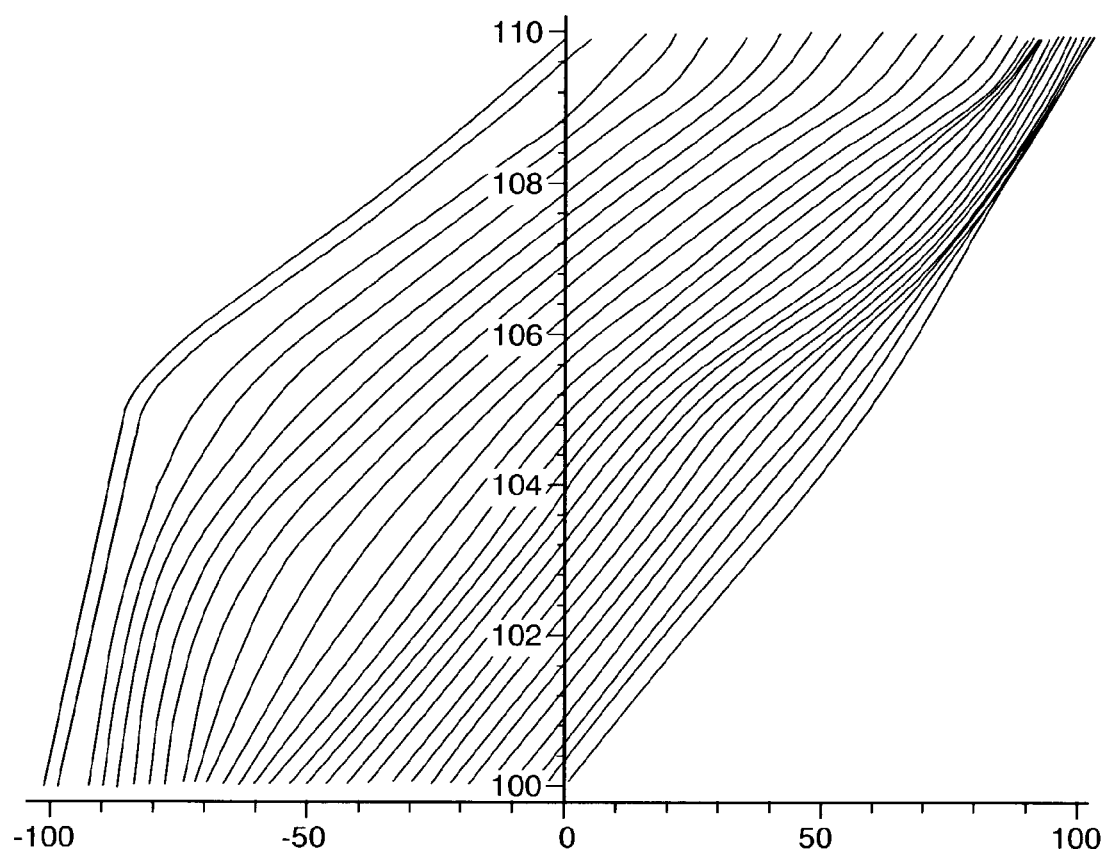

More specifically, the derivatives dx and dy at point (x,y) on the Bezier surface are evaluated. Numerical approximations are used to calculate the derivatives. The next step is to evaluate the Bezier surface patch at the array values (TW1[i], HW1[i]), and the values are stored in Q1[i][j] $0 \leq m1$, $0 \leq j \leq n1$. Next, in accordance with step 716, the calculated data is checked to verify that monotonicity is preserved. The calculated values can then be displayed in the desired print format. Examples of this aspect of the present invention will now be considered. The examples are in the forms of graphs surface data and families of TW curves that are chosen to demonstrate the effectiveness of the method in accordance with the present invention embodied in a computer software program in achieving smoothness and in preserving the monotonicity of the surface data, as well as the condition Q=0 when TW=HW. In all surface plots, Q is plotted as a function of TW and HW. An example showing curve data, the horizontal axis is flow (O) and the vertical axis is headwater (HW). Each curve represents a fixed tailwater value. FIG. 8A is the set of three curves: 802, 804 and 806 corresponding to a set of data with three TW values and three HW values with a 3×3 array of Q values plotted as TW curves. Note that the curves are all monotone increasing as HW increases, and the monotonicity is preserved in the subsequent examples. As illustrated in FIG. 8B, this figure is the curve plot from the interpolated data giving 31 curves. It can be seen that the curves are smooth and follow the general monotonicity and shape of the 3 curves of FIG. 8A.

Figure 8C:
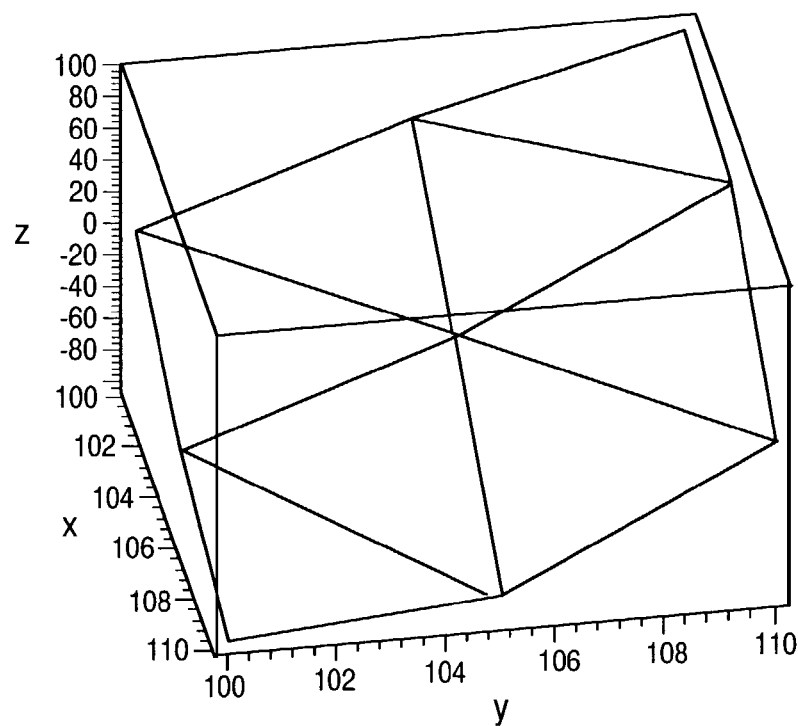
Figure 8D:
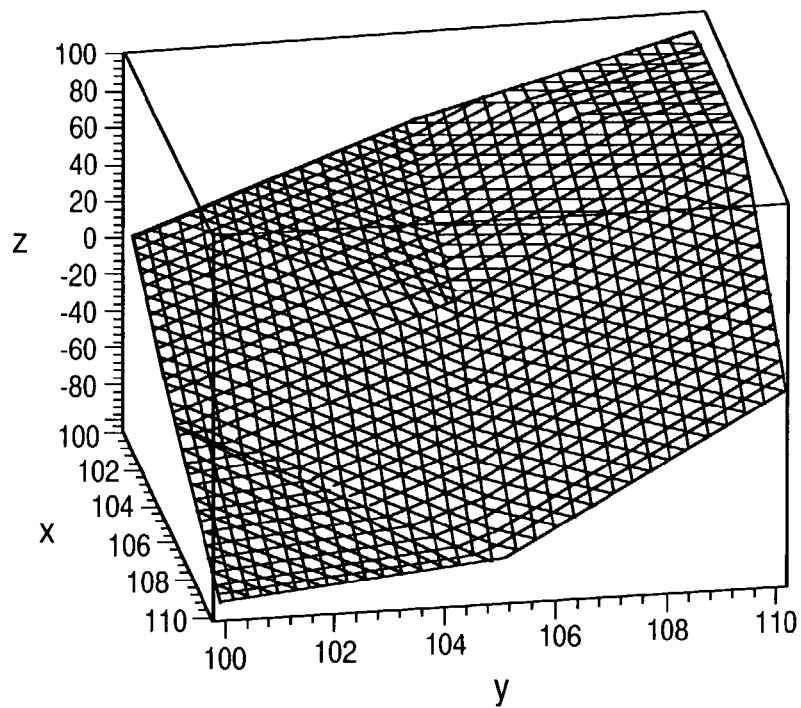

FIG. 8C is a three-dimensional plot, also known as a surface plot of Q(z) as a function of TW(x) and HW(y) for the triangulated original data. FIG. 8D is the surface plot of Q as a function of TW and HW for the smooth surface fit at 31 TW and 31 HW values respectively and, it can be seen that the smooth surface having the same overall contour, as that shown in FIG. 8C, but with greater accuracy has been provided. It should be understood that the present invention provides a method for improved representation of flow data in the form of output of headwater, tailwater and flow Q is provided in a software program embodying the invention. The software program embodying the invention generates a surface in the form of Q=f(TW,HW), and allows the calculation of the flow Q. Given any two values of TW and HW, the user can calculate values of flow for values of TW and HW in between the discreet data provided in a given data set. The constraints of Q values being monotone increasing in HW and monotone decreasing in TW and that Q=0 whenever TW=HW are preserved as a program in accordance with the invention. The invention thus provides a robust and accurate method of representing hydraulic flow data even when that data is generated from underlying structures in the actual network that can cause difficulties in numerically representing those structures and flow categories.

The foregoing description has been directed to specific embodiments of the invention. It will be apparent, however, that other variations and modifications may be made to the described embodiments, with the attainment of some or all of the advantages of such. Therefore, it is the object of the appended claims to cover all such variations and modifications as come within the true spirit and scope of the invention.

What is claimed is:

1. A method of producing a triangulated surface representation of flow data at a selected portion of a gravity hydraulic network comprising the steps of:
    (A) generating at least three matrices of values, including one for headwater, tailwater and flow for a selected portion of the hydraulic network;
    (B) plotting tailwater values on an x-axis versus headwater values on a y-axis as data points to produce data rectangles in a tailwater-headwater plane;
    (C) adding additional data points by splitting each data rectangle into a plurality of subrectangles and dividing the subrectangles into triangles; and
    (D) calculating and storing, in a doubly indexed array of integers, tailwater and headwater values for given values of flow, while preserving the condition that flow is zero when tailwater equals headwater; and
    (E) plotting each flow value on a z-axis for each triangle for producing a triangulated surface representation of the flow data in three dimensional space.

2. The method as defined in claim 1 comprising the further step of assigning a case value to each data rectangle to determine the number of triangles into which the data rectangle is to be split to form said plurality of triangles in three-dimensional space which form a triangulated surface representation.

3. The method as defined in claim 2 wherein, in response to said case value being determined to be 1, then subdividing the rectangle into two triangles.

4. The method as defined in claim 2 wherein, in response to said case value being 2 or 3, then subdividing the rectangle into three triangles.

5. The method as defined in claim 2 including the further step of, in response to the case value being 4, subdividing the rectangle into four triangles.

6. The method as defined in claim 1 including the further step of evaluating the flow Q corresponding to the TW=x and HW=y.

7. The method as defined in claim 6, determining the triangle in two dimensional space containing the point (x,y).

8. The method as defined in claim 6 including the further step of determining the value of Q by calculating the point on the plane determined by the corresponding triangle in three-dimensional space.

9. The method as defined in claim 1 including the further step of calculating the partial derivatives in the TW and HW directions for the point x,y.

10. The method as defined in claim 1 including the further steps of:
    (A) generating input arrays with input data of tailwater (TW) values and headwater (HW) values;

calculating flow values (Q) for each tailwater and headwater values in the arrays.

11. The method as defined in claim 10 including the further steps of:
(A) adjusting Q values to guarantee that the data is monotone and satisfies Q=0;
(B) adjusting slopes to guarantee that they are consistent within monotonicity of the underlying input data; and
(C) adjusting the slopes so that the smooth surface will maintain the condition Q=0 when HW=TW.

12. The method as defined in claim 11 including the further step of:
iteratively repeating said slope adjusting step procedure until convergence is reached.

13. The method as defined in claim 11 including the further steps of:
(A) generating the value of a Bezier surface at (u,v,w);
(B) evaluating the smooth triangle Bezier patch surface at (x,y);
(C) setting up the four triangles at the split of the rectangle;
(D) finding the Barycentric coordinates (u,v,w) of x,y in the triangle;
(E) using numerical methods to calculate the derivatives in the x and y directions;
(F) evaluating patched Bezier surfaces; and
(G) checking to ascertain that monotonicity is preserved.

14. The method of producing a triangulated surface representation of flow data describing a gravity hydraulic network as defined in claim 13 including transforming said patched Bezier surfaces into a representation of flow data in a gravity hydraulic network.

15. A system embodied in a software program for incorporating representations of certain hydraulic elements into a model of a hydraulic network, comprising:
(A) at least one hydraulic network solver program that produces a hydraulic network model from an associated database describing elements of the hydraulic network;
(B) means associated with said network solver program and said database for providing a smooth surface interpolation of flow data including:
   (i) means for producing representations of planes for evaluating flow in which tailwater is substantially equal to headwater;
   (ii) means for identifying at least one data rectangle in each plane;
   (iii) means for dividing each data rectangle into a plurality of subrectangles;
   (iv) means for triangulating each data subrectangle into one or more data triangles; and
   (v) means for introducing a surface patch over each triangle; and
(C) means for generating a surface representation of the flow throughout the hydraulic network using said surface patches in said network solver program.

16. The system embodied in a software program for incorporating representations of hydraulic elements into a model of a hydraulic network, further comprising means for iteratively calculating conditions for the condition of flow being substantially equal to zero when headwater is substantially equal to tailwater.

17. A computer readable medium for producing a triangulated surface representation of flow data describing a portion of a gravity hydraulic network in a model of said hydraulic network, comprising program instructions for performing the steps of:
identifying data points to be represented in the model of the system;
producing data rectangles describing a plurality of data points in a plane;
interpolating monotone surface data by splitting each data rectangle of said plurality of data rectangles into several triangles; and
introducing a mathematical surface patch over each triangle to provide a smooth surface model of the portion of the hydraulic network being described.

18. The computer readable medium for producing a triangulated surface representation of flow data as described in claim 17 comprising instructions for performing the further steps of:
determining control points for each surface patch such that conditions required to preserve monotonicity are satisfied.

19. The computer readable medium for producing triangulated surface representations of flow data defined in claim 17 comprising instructions for performing the further step of displaying said representation in a graphic user interface as a three-dimensional graph.

* * * * *